May 7, 1935. J. A. MUZZIO 2,000,472

EGG SEPARATOR

Filed Feb. 23, 1934

INVENTOR:
JAMES A. MUZZIO

BY Saywell and Wesseler
ATTORNEYS

Patented May 7, 1935

2,000,472

UNITED STATES PATENT OFFICE 2,000,472

EGG SEPARATOR

James A. Muzzio, Madison, Ohio

Application February 23, 1934, Serial No. 712,465

6 Claims. (Cl. 146—2)

My invention particularly relates to improvements in egg separators wherein the white and yolk of one or more eggs may be conveniently and thoroughly separated by apparatus which is economically manufactured, easily operated, and lends itself to quantity production in sizes adaptable for domestic use.

The annexed drawing and the following description set forth in detail certain means illustrating my invention, such means constituting, however, but one of the forms in which the principle of the invention may be embodied.

Figure 1:
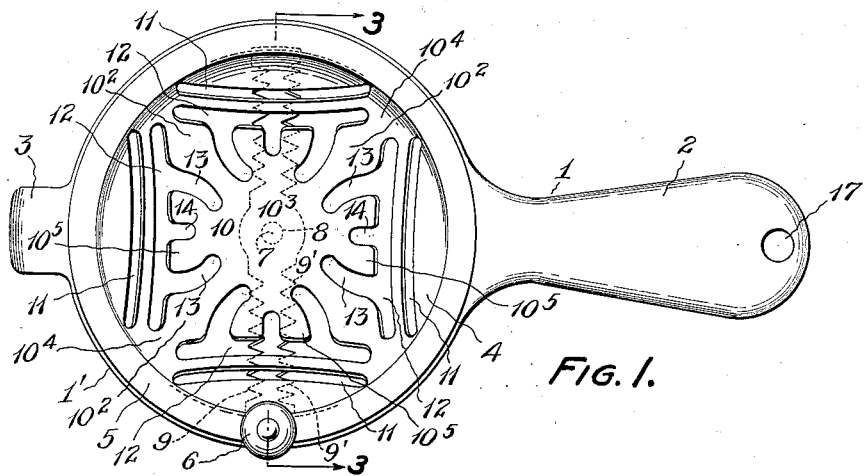
Figure 1 is a plan view of my improved egg separator in assembled condition.
Figure 2:
Figure 2 is a side view of the assembled egg separator.
Figure 2:
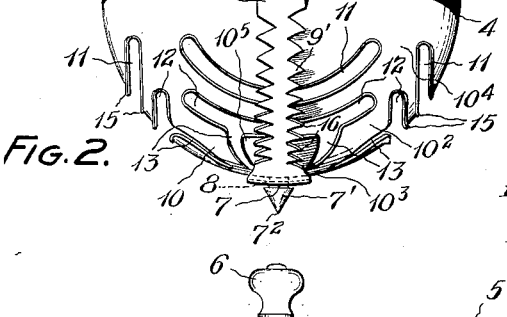
Figure 3:
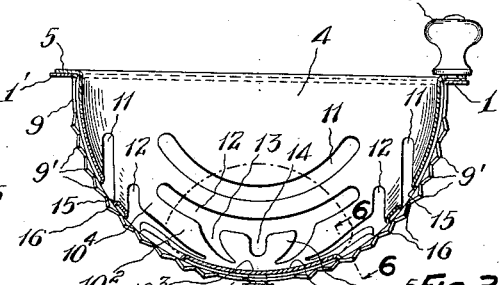
Figure 3 is a vertical section, taken in the plane indicated by the line 3—3, Figure 1.
Figure 4:
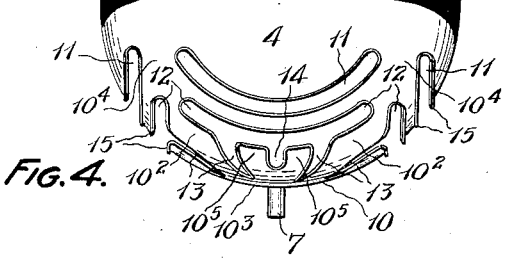
Figure 4 is a side view of a rotatable basket element forming an inner member of my improved egg separator.

Referring to the annexed drawing in which the same parts are indicated by the same respective numbers in the several views, a holder or support member 1 of my improved egg separator has an annular horizontal slide-way portion 1' serving as a bearing for an inner cup-shaped basket 4 having an upper outwardly-extended horizontal flange 5 serving as a journal member and adapted to rest upon and turn on the bearing 1'. The support and holder member 1 is formed with a handle 2 serving as means whereby the whole device may be manually held, said support and holder member 1 having formed upon the side thereof diametrically opposite the handle 2 a lip 3 by means of which the device may be rested upon the edge of a bowl, tumbler, or other suitable device into which it is desired to gather the white of the egg or eggs being separated.

The basket member 4 can be rotated within the holder 1 by means of an upstanding finger piece 6 formed upon the basket 4. For centering the basket 4 in the proper position in the holder 1, and retaining the same therein, and also for preventing the basket from becoming separated from the holder 1, when the device is not in use, as hereinafter clearly explained, I secure to the lower portion of the basket 4 a depending pin 7 adapted to pass through a hole 8 formed in the center of a semi-elliptical bearing strap 9 secured to diametrically opposite points upon the bearing member 1' and extended downwardly therefrom, this pin 7 having an enlarged lower-end body portion 7' formed with a pointed drainage terminal 7².

When the egg or eggs are broken into the basket 4, the yolks are retained therein upon the bed 10 of the basket 4, and the whites pass through certain slots in the basket into the receiving vessel. The aforementioned slots are of varied characters and varied cross-sectional outlines, symmetrically arranged about the axis of the basket 4, and comprise arcuate downwardly-curved slots 11 in the upper part of the yolk bed 10, there being four such slots 11 and, in fact, all of the slots are arranged in series of four or multiples thereof, for purposes of illustration. I do not, however, limit myself to any particular number of slots in the various symmetrical series of slots arranged about the basket axis. Below the slots 11 is a second series of arcuate downwardly-curved slots 12 disposed substantially parallel to the slots 11, and opening into each of these slots 12 is a series of upwardly-extended slots, three in number, of which the outer two slots 13 are somewhat longer than an intermediate slot 14. There are thus formed four connecting or arm portions 10² of the yolk bed 10 which are secured to a bottom central portion 10³ of said yolk bed 10 and, respectively, to four upper yolk bed portions 10⁴ spaced substantially 90° apart, as clearly shown in Figure 1, and eight outwardly and upwardly-extended finger portions 10⁵, there being two finger portions 10⁵ between each two adjacent arm portions 10².

Figure 6:
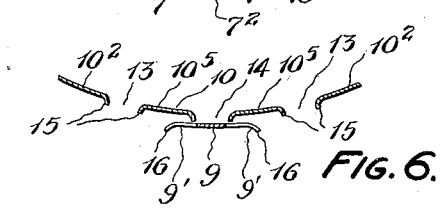
Figure 6 is a fragmentary section, upon an enlarged scale, taken in the plane indicated by the line 6—6, Figure 3.
Figure 5:
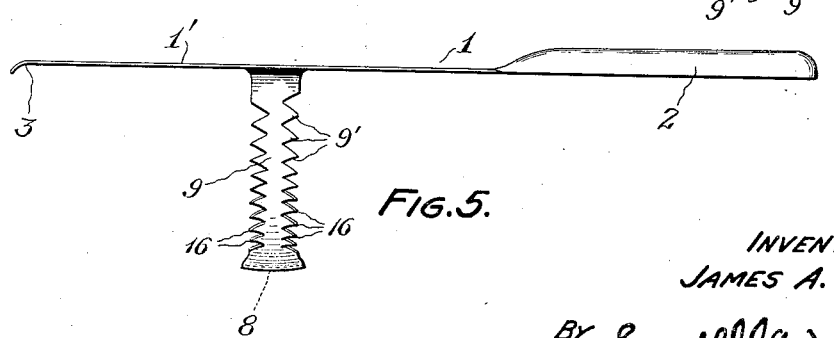
Figure 5 is a side view of an outer support and holder for the rotatable basket shown in Figure 4.

For the purpose of providing means which will insure not cutting the yolk and causing some of the latter to pass through the various slots and become intermingled with the whites that are being gathered in the receiving vessel, I provide those portions of the basket 4 which form the edges of the various slots with outwardly-projecting lips 15, as clearly shown in Figure 6. These lips 15 are projected in a direction opposite to that of the direction of rotation of the basket 4 but, inasmuch as it is desired to provide for rotation of the basket 4 in either direction, both edges of the various slots are formed with the outwardly-projecting lips 15.

I form the strap 9 with a series of teeth 9' along each of its edges, the teeth along one edge preferably being staggered in position with those upon the opposite edge in order to preserve as much of the material of the strap 9 as is possible and thus insure the maximum strength of the strap, all these teeth 9' also having outwardly and downwardly-projecting lips 16, as clearly seen in Figure 6, this construction also permitting rotation of the basket 4 in either direction.

When the separator is not being used and it is desired to store it, it can be hung upon a nail by means of the hole 17 formed in the handle 2 of the holder 1, the enlarged body portion 7' formed upon the pin 7 below the strap 9 insuring the holding together of the holder 1 and the basket 4. The purpose of the pointed terminal 7² upon the pin 7 is to provide for the thorough draining of the egg whites from the separator.

The slot arrangement which I provide in the basket 4 insures a clean thorough passage of the whites into the receiving receptacle and a retaining of the egg yolks intact in the yolk bed 10, the drainage of the final portions of the white from the separator being made complete by reason of the pin terminal area 7². Within the limit of the capacity of the yolk bed 10, as many eggs can be separated at one operation as is desired.

What I claim is:

1. An egg separator comprising a support having an annular body portion and a downwardly-extended diametrically-connected strap, a basket rotatable in and on the body portion and centered in the strap, the basket being formed with a plurality of slots, the strap having a series of teeth projecting oppositely to the direction of basket rotation, said teeth being formed with outwardly-projecting lips.

2. An egg separator comprising a support having an annular body portion and a downwardly-extended diametrically-connected strap, a basket rotatable in and on the body portion and formed with a pin extended downwardly from the bottom thereof, the strap having a central hole with which the pin engages and in which it is freely rotatable, a plurality of series of slots formed in the basket and each symmmetrically arranged about the basket axis, the basket having outwardly-projecting lips forming the edges of the slots, the strap having a series of teeth formed upon each of its two edges, said teeth being formed with outwardly-projecting lips.

3. An egg separator comprising a support having an annular body portion and a downwardly-extended diametrically-connected strap, a basket rotatable in and on the body portion and formed with a pin extended downwardly from the bottom thereof, the strap having a central hole with which the pin engages and in which it is freely rotatable, an enlarged body portion formed on the pin below the strap, the said pin body portion having a pointed drainage terminal, a plurality of series of slots formed in the basket and each symmetrically arranged about the basket axis, the basket having outwardly-projecting lips forming the edges of the slots, the strap having a series of teeth formed upon each of its two edges, said teeth being formed with outwardly-projecting lips.

4. An egg separator comprising an annular support having a bearing strap depending from and connecting diametrically opposed portions of the support and a basket rotatably mounted at its bottom on said bearing strap, said bearing strap having teeth on its opposite edges, and said basket having an upper annular element closely and slidably contacting with said annular support and having discharge openings the edges of which pass close to said teeth when the basket is rotated.

5. An egg separator comprising an annular support having a semi-elliptical bearing strap depending from and connecting diametrically opposed portions of the annular support and a basket rotatably mounted in said support, said basket being closely similar in vertical cross-section to the semi-elliptical form of said bearing strap and being in horizontal cross-section of substantially circular form, and said basket having a substantial part of its central bottom portion imperforate, slots radiating part way up the basket sides from said imperforate bottom portion, and slots farther up the basket sides extending substantially transversely to the first-mentioned slots.

6. An egg separator comprising a perforated basket and a support therefor; said support having an annular body portion, means on said body portion for engaging the edge of a receptacle adapted to receive said basket and for holding the support on said receptacle, and a bearing member extending downwardly and inwardly from said body portion; and said basket being rotatably mounted on said bearing member and having an annular element slidably contacting with said annular body portion and a handle extending upwardly from said basket.

JAMES A. MUZZIO.